(12) United States Patent
Moore et al.

(10) Patent No.: US 7,493,410 B2
(45) Date of Patent: Feb. 17, 2009

(54) METHOD AND APPARATUS FOR SWITCHED PHYSICAL ALTERNATE LINKS IN A PACKET NETWORK

(75) Inventors: Brian Moore, Edmonton (CA); Stuart John Lomas, Edmonton (CA)

(73) Assignee: Bigbangwidth Inc., Edmonton (CA)

( * ) Notice: Subject to any disclaimer, the term of this patent is extended or adjusted under 35 U.S.C. 154(b) by 1108 days.

(21) Appl. No.: 10/459,084

(22) Filed: Jun. 10, 2003

(65) Prior Publication Data

US 2003/0229700 A1 Dec. 11, 2003

Related U.S. Application Data

(60) Provisional application No. 60/388,101, filed on Jun. 11, 2002.

(51) Int. Cl.
*G06F 15/173* (2006.01)
(52) U.S. Cl. .................. 709/238; 709/203; 709/223; 709/242; 709/249; 370/358; 370/359
(58) Field of Classification Search ............. 709/223, 709/238, 242, 249; 370/358, 359
See application file for complete search history.

(56) References Cited

U.S. PATENT DOCUMENTS

| | | | | |
|---|---|---|---|---|
| 6,161,141 | A | 12/2000 | Dillon | 709/230 |
| 6,260,092 | B1 | 7/2001 | Story et al. | 710/128 |
| 6,262,976 | B1 | 7/2001 | McNamara | 370/254 |
| 6,336,156 | B1 | 1/2002 | Chiang | 710/45 |
| 6,345,052 | B1 | 2/2002 | Tse et al. | 370/395.6 |
| 6,366,951 | B1 | 4/2002 | Schmidt | 709/208 |
| 6,578,083 | B2* | 6/2003 | Tuck, III | 709/235 |
| 6,831,916 | B1* | 12/2004 | Parthasarathy et al. | 370/359 |
| 6,917,987 | B2* | 7/2005 | Parthasarathy et al. | 709/249 |
| 2002/0133622 | A1* | 9/2002 | Pinto | 709/242 |
| 2003/0033427 | A1* | 2/2003 | Brahmaroutu | 709/238 |
| 2003/0208572 | A1* | 11/2003 | Shah et al. | 709/223 |

OTHER PUBLICATIONS

Constraint-based path selection methods for on-demand provisioning in WDM networks, Admela Jukan and Gerald Franzl, IEEE INFOCOM conference, Jun. 2002, 10 pages.

GMPLS-Based Photonic Multilayer Router (Hikari Router) Architecture: An Overview of Traffic Engineering and Signaling Technology, Ken-ichi Sato, Naoaki Yamanaka, Yoshihiro Takigawa, Masafumi Koga, Satoru Okamoto, Kohei Shiomoto, Eiji Oki, and Wataru Imajuku, IEEE Communications Magazine, Mar. 2002, pp. 96-101.

(Continued)

*Primary Examiner*—Jinsong Hu
(74) *Attorney, Agent, or Firm*—Christensen O'Connor Johnson Kindness PLLC

(57) ABSTRACT

A method and apparatus for improved operation of a packet network by controllably providing switched physical alternate links between packet network nodes, at least one of which is a host, and using those switched physical alternate links to supplement the capacity of the packet network. A switched physical alternate link is composed of physical elements, switchable connection devices, and a manager, such that a switched physical alternate link behaves as a single point-to-point physical link between nodes in a packet network. Creating and removing switched physical alternate links as the packet network operates provides supplemental carrying capacity between the packet network nodes connected by switched physical alternate links, while overall packet network congestion is simultaneously reduced.

12 Claims, 2 Drawing Sheets

OTHER PUBLICATIONS

PCT International Search Report, PCT/CA02/01509, Apr. 28, 2003, 3 pages.

Rekhter Y. et al: RFC1937: Local/Remote Forwarding Decision in Switched Data Link Subnetworks 'Online! May 1996, IETF, Internet, pp. 1-8, xp002238929 Retrieved from the Internet: URL: ftp://ftp.isi.edu/in-notes/rfc1937.txt>'retrieved on Apr. 22, 2003!, p. 1—p. 5.

Cansever D.: RFC2333: NHRP Protocol Applicability Statement 'Online! Apr. 1998, IETF, Internet, pp. 1-9, XP002238930 Retrieved from the Internet: <URL:ftp://ftp.isi.edu/innotes/rfc2333.txt>'retrieved on 2003422!, p. 1 to p. 4.

Luciani J. et al: RFC2332: NBMA Next Hop Resolution Protocol (NHRP) 'Online! Apr. 1998, IETF, Internet, pp. 1 to 52, XP002238931 Retrieved from the Internet: <URL:ftp://ft[/isi.edu/innotes/rfc2332.txt> retrieved on 2003422! , p. 1, p. 3 to p. 6, p. 49.

\* cited by examiner

METHOD AND APPARATUS FOR SWITCHED PHYSICAL ALTERNATE LINKS IN A PACKET NETWORK

CROSS-REFERENCE TO RELATED APPLICATION

This application claims the benefit of U.S. Provisional Application No. 60/388,101, filed Jun. 11, 2002.

FIELD OF THE INVENTION

The present invention relates to a method and an apparatus for switched physical alternate data links that behave as single point-to-point physical links between nodes in a packet network, to improve network capacity and to reduce congestion.

DESCRIPTION OF THE PRIOR ART

A packet network typically comprises a plurality of hosts and at least one router. The term "host" as used herein will refer to any device that primarily transmits and receives only its own traffic. Thus workstations, PCs and servers are examples of hosts. The term "router" as used herein will refer to any device that is primarily used to transmit other devices' information. Thus Ethernet hubs, Fiber Channel switches and Internet Protocol (IP) Routers are all examples of routers.

Physical connections in packet networks are typically from a host to a router, or between routers. Direct host-to-host connections are also possible, and create a network of exactly two hosts. In packet networks that include a router, each data packet that is transferred between hosts is first transmitted to a router, which determines which host or router to send that packet to next.

It is possible for a host to participate in more than one network at the same time through different network interfaces.

Problems arise when a large flow of data packets is to be transmitted from one host to another host via a series of routers to which other hosts are also connected. Such a large flow of data packets can monopolize the available bandwidth on the links between the routers to such an extent that traffic between other hosts on the network is disrupted. Viewed another way, the large flow of data packets may itself be disrupted or slowed by traffic between other unrelated hosts. Many solutions have been created to mitigate this problem, either by managing the sharing of bandwidth between hosts, or by increasing the carrying capacity of the links between routers, examples from the PRIOR ART including bandwidth management schemes, higher speed protocols (fastE, GigE, 10 GigE, increasing Optical Carrier speeds, etc and channel bonding (MLPPP, etc).

Schmidt in U.S. Pat. No. 6,366,951, issued in 2002, describes a distributed processing system where a management computer automatically connects remote reduced-capability workstations with centralized computing modules. The centralized workstations are switched on and off based on how busy they are. Individual computer workstations are connected with individual processing units by the management computer, and are disconnected when the link is no longer needed. In this system, the network is off-loaded when not busy. The system does not include assignment of a dedicated link for transmission of large data packet flows in parallel with a conventional shared-use link.

Tse and McDowell in U.S. Pat. No. 6,345,052, issued in 2002, describe a localized sampling architecture for the reliable transition of status signals from an interface device. The method that is described illustrates traffic flow to and from hardware devices under heavy traffic conditions, and the need to assign both shared-use links and time of use of said links.

Chiang in U.S. Pat. No. 6,336,156, issued in 2002, describes dynamic slot allocation for increased speed of initialization of a multiport switch. A scheduler increases the amount of bandwidth allocated to initialization logic; the amount of bandwidth allocated is then decreased once the port has been initialized. During normal operation of the switch, the scheduler allocates address table bandwidth to various components of the multiport switch.

McNamara in U.S. Pat. No. 6,262,976, issued in 2001, describes a system and a method for network flow optimization using traffic classes. Classes of traffic include interior (within a packet network), interior to exterior, exterior to interior, and transitory. A link is established depending on the class of the traffic.

Story et al. in U.S. Pat. No. 6,260,092, issued in 2001, describe a method of use of a fiber channel for serialized local bridging. The system provides enhanced traffic loading thereby enhancing link performance in a point-to-point or ring connected network.

Dillon in U.S. Pat. No. 6,161,141, issued in 2000, describes network system with TCP/IP protocol spoofing. Dual paths are available for low speed and high speed communications. However, no provision is made for switching between the paths based on the nature of the traffic, for example on the sizes of data packet flows.

Schemes also exist for managing the physical paths over which packet data is transferred. Examples include the Hikari Router, as described by Sato et al. in IEEE Communications Magazine March 2002 pp 96-101, which uses GMPLS to create wavelength paths between routers, and by Jukan and Franzl in "Constraint-based path selection methods for on-demand provisioning in WDM networks", IEEE INFOCOM conference, June 2002; and references cited in this paper.

What is needed is a means for transmitting large data packet flows between hosts and, optionally, other selected nodes, in a packet network in an uninterrupted, secure, and rapid manner while allowing other/normal traffic simultaneously to be transmitted over the packet network, without either type of transmission adversely affecting the other.

SUMMARY OF THE INVENTION

The present invention is a system for providing switched physical alternate links between nodes in a packet network, where at least one of the nodes is a host, and using those switched physical alternate links to supplement the capacity of the packet network between those nodes.

A switched physical alternate link, or "SPAL", comprises physical elements and switchable connection devices, such that a SPAL behaves as a single point-to-point physical link between two nodes (host to host, or host to router) in a packet network.

Creating and removing SPALs as the packet network operates supplements carrying capacity between the packet network hosts connected by SPALs, while overall packet network congestion is simultaneously reduced, thereby providing superior performance capability when compared with the capabilities of PRIOR ART packet networks.

A set of hosts and optionally routers that are able to communicate to one another across a PRIOR ART packet network, and which are also able to have a SPAL created between some or all pairs of them, are called "SPAL Nodes". A current implementation uses a software process called the SPAL Client Software, which runs in each SPAL Node and controls one end point of each SPAL.

A SPAL Manager is a software and/or hardware device that communicates with some or all SPAL Nodes, and creates and destroys SPALs according to at least one configurable criteria.

A SPAL Network is comprised of two or more SPAL Nodes, which may contain SPAL Client Software, the equipment that comprises the SPALs, and one or more SPAL Managers.

A SPAL Manager may be requested to create a SPAL by one or more of the SPAL Nodes, or the SPAL Manager might receive some external request to create a SPAL, possibly based on a criterion such as a time of day, a reservation system, a request from a human operator, or other internal or external event.

Soon after a SPAL is created, a SPAL Manager directs the SPAL Node at each end of the SPAL to direct traffic over the newly created SPAL. Prior to destroying a SPAL, a SPAL Manager directs the SPAL Nodes at each end of that SPAL to cease directing traffic over that SPAL. In an Internet Protocol packet network, traffic can be directed by inserting or deleting appropriate entries in the IP Routing Table, in a manner that will be readily apparent to one skilled in the art.

The SPAL Network can automatically determine when to request a SPAL by monitoring network traffic for one or more specific characteristics, called "criterion characteristics". Criterion characteristics include the following non-limiting examples: size of packet flow; packet flow rate; destination; time of day; user policy; type of data. One embodiment of the system has shown that the SPAL Client Software can be used to monitor network traffic for criterion characteristics, however in principal this monitoring could be done elsewhere within the packet network.

The set of criteria that are monitor for, and their specific attributes, can be modified by a management interface. This allows the set of criterion characteristics that are in effect to change over time.

DESCRIPTION OF THE INVENTION

A packet network system 10 having an apparatus 12 overlaid thereon for creating switched physical alternative links (SPAL) will be described with reference to FIGS. 1 and 2.

Figure 1:
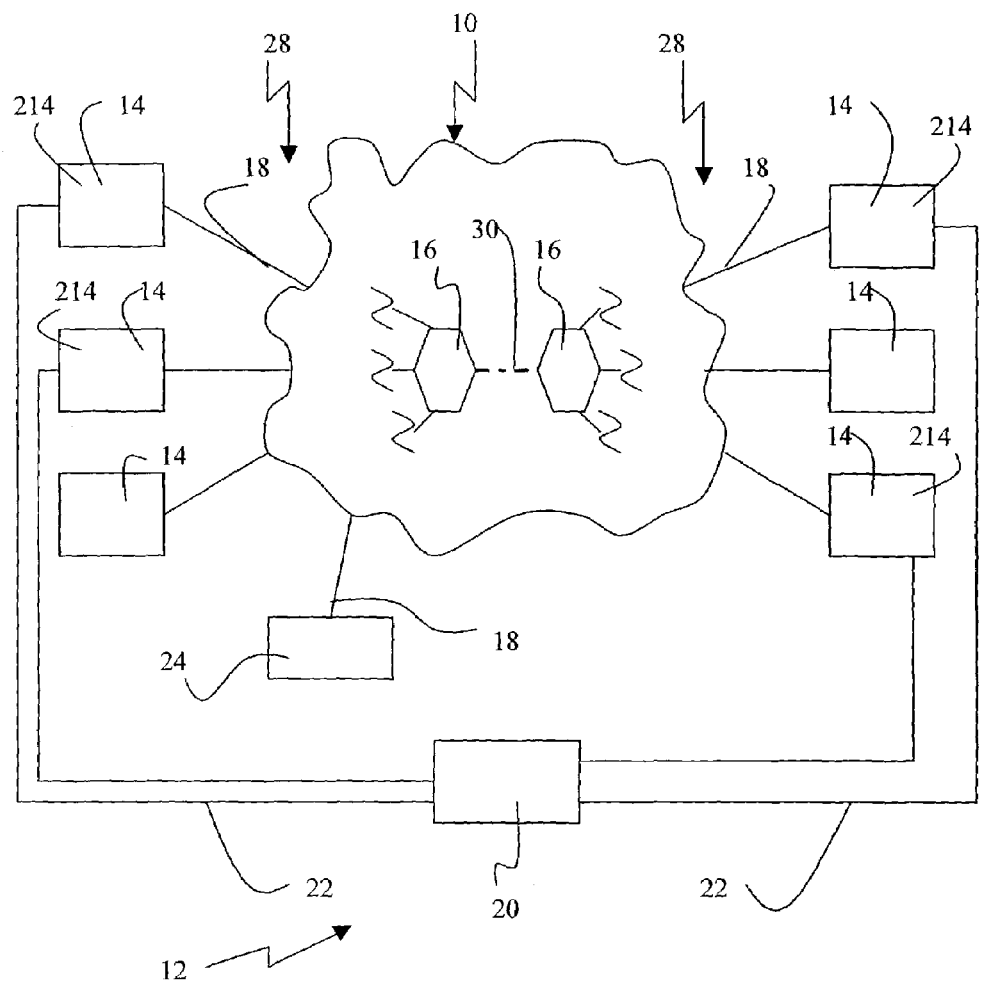
FIG. 1 is a schematic representation of a packet network having an apparatus for creating switched physical alternate links overlain thereon.
Figure 2:
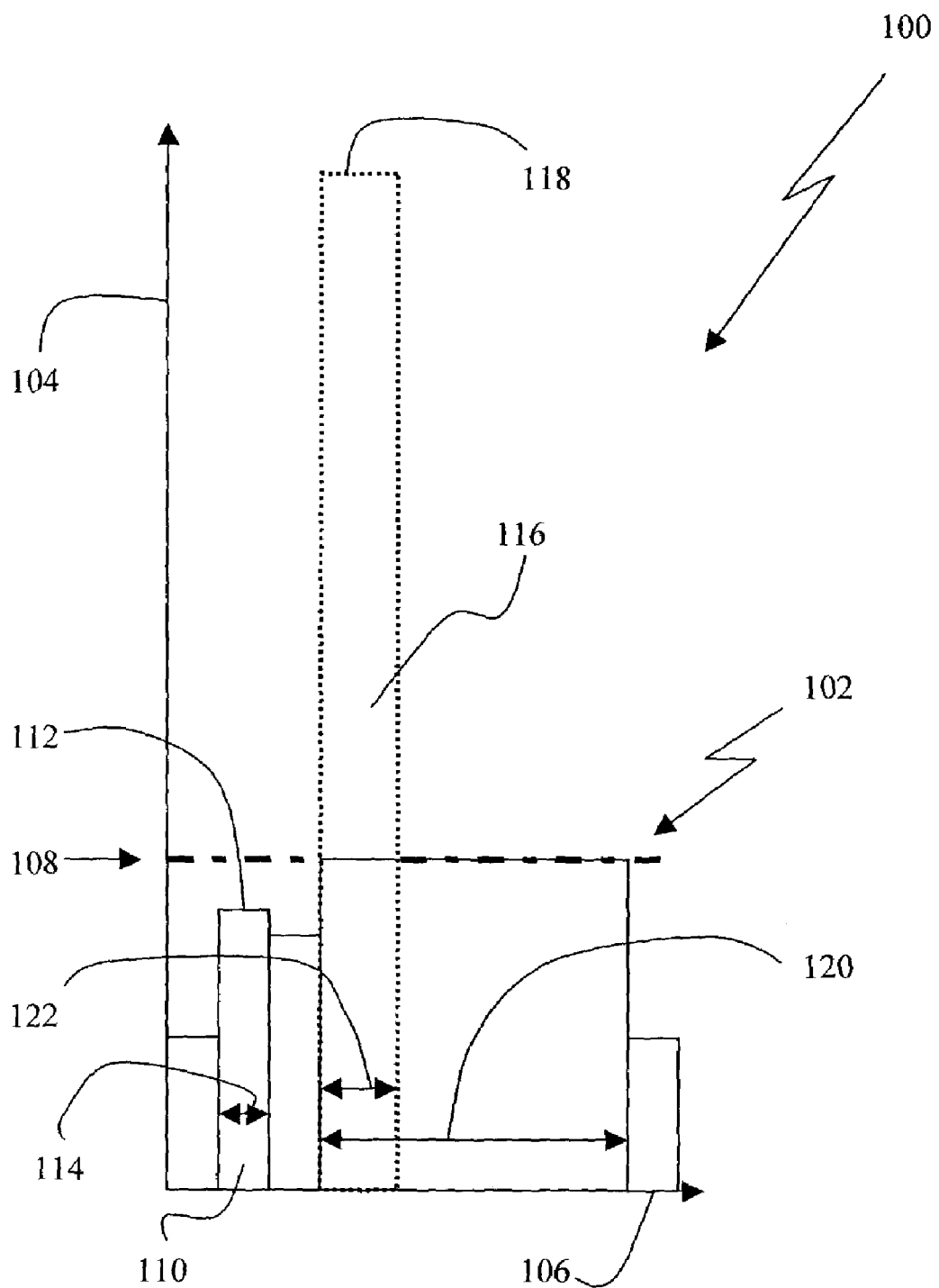
FIG. 2 is an illustration of the effect of transmission of large data packet flow along a link having a limited capability for an amount of data that can be transmitted within a given length of time.

Referring to FIG. 1, packet network 10 typically comprises a plurality of hosts 14, at least one router 16 and a plurality of links 18 connecting each of hosts 14 with one of routers 16. Packet network 10 can be a complex packet network comprised of several clusters 28, each cluster having at least one host 14 and router 16. A complex packet network 10 having two clusters 28 is illustrated schematically in FIG. 1. In complex packet network 10, routers 16 are linked via links 30.

Apparatus 12 comprises at least one switch 20, a plurality of communication links 22 that connect selected hosts 14 individually with switch 20. Optionally, selected routers 16 also are connected via additional communication links 22 with switch 20. Selected hosts 14 and selected routers 16 connected to switch 20 are "SPAL Nodes" 214. At least one SPAL Manager 24 is in communication with each of SPAL Nodes 214. SPAL Manager 24 includes a software program that manages traffic between SPAL Nodes 214 via apparatus 12. Optionally, said software program is SPAL Client software installed in SPAL node 214.

When traffic is to be sent from one of SPAL Nodes 214 to another of SPAL Nodes 214, software installed in one of SPAL Nodes 214 and the manager monitors said traffic to determine at least one criterion characteristic of data flow for transmission of said traffic in order to determine whether a need exists for a SPAL. Said criterion characteristic may be, as non-limiting examples: size of packet flow; packet flow rate; destination; time of day; user policy; type of data. When said characteristic matches pre-programmed criteria, SPAL Manager 24 determines that said traffic is to be transmitted via apparatus 12 instead of via links 18 of packet network system 10. When said characteristic does not match pre-programmed criteria, SPAL Manager 24 determines that said traffic is to be transmitted via packet network system 10. Also, traffic is transmitted via packet network 10 instead of via apparatus 12 in response to other events caused by situations internal to apparatus 12, packet network 10, or as a default setting.

As one example of the criteria that may be established for use of apparatus 12, the effect of traffic flow size will be illustrated with reference to FIG. 2.

When packet network 10 is used without apparatus 12, a limitation on use of packet network 10 occurs when large data packet flow rates are to be transmitted between hosts 14 along links 18 via router 16. Referring to FIG. 2, the time-performance 100 of packet network 10 is shown in which data packet flows 102 having different sizes 104 are transmitted at different times 106.

Links 18 have a maximum rate 108 at which data can be transmitted. When a small amount of data 110 is to be transmitted between hosts 14, and a rate 112 at which said data is transmittable is lower than maximum rate 108, an elapsed time 114 for transmission of said small packet flow rate 110 has a low value. In contrast, when a large amount of data 116 is to be transmitted, the rate 118 at which said hosts 14 can transmit data may exceed maximum rate 108. In this case, the data packet flow rate cannot exceed maximum rate 108 and so an elapsed time 120 for transmission of said large data packet flow rate 116 is large when compared with a theoretical elapsed time 122 for transmission of large amount of data 116 at rate 118. Because elapsed time 120 for transmission of large amount of data 116 is large, communication of other data packet flows 102 along links 18 is either delayed or prevented, thereby causing inconvenience or delays. In extreme cases, communication between hosts 14 via router 16 may be severely compromised.

To circumvent the inconveniences to packet network 10 caused by, for example, traffic requiring large flow rates, such traffic is diverted via apparatus 12, as follows.

When traffic is to be transmitted via apparatus 12, SPAL Manager 24 establishes a SPAL comprising at least one switch 20 and communication links 22. Said SPAL then behaves as a single point-to-point physical link between one SPAL Node 214 and another SPAL Node 214. The point-to-point physical link so established is dedicated between one SPAL Node 214 and another SPAL Node 214 for the duration required for complete transmission of said traffic.

When a SPAL has been created, a SPAL Manager 24 directs the SPAL Node 214 at each end of the SPAL to direct traffic over the newly created SPAL. Prior to destroying a SPAL, a SPAL Manager directs the SPAL Nodes 214 at each end of that SPAL to cease directing traffic over that SPAL. In an Internet Protocol packet network, traffic can be directed by inserting or deleting appropriate entries in the IP Routing Table, in a manner that will be readily apparent to one skilled in the art.

The SPAL Network can automatically determine when to request a SPAL by monitoring network traffic for one or more criterion characteristics. In the implementation of the system described herein, the SPAL Client Software monitors network traffic for criterion characteristics, but it will be recognized by those skilled in the art that this monitoring could be done elsewhere within the packet network.

The set of criteria that are monitored, and their specific attributes, can be modified by a management interface. This allows the set of criterion characteristics that are in effect to change over time.

Establishment of said point-to-point physical link via apparatus 12 provides advantages including:

network capacity is enhanced by availability of apparatus 12;

congestion in packet network 10 is reduced by providing alternate links for transmission of traffic;

routing is host-to-host, by-passing one or more routers and/or switches;

traffic requiring large data flow rates is transmitted between one host 14 and another host 14 via a SPAL established using apparatus 12 in an uninterrupted manner; and traffic is transmitted between one host 14 and another host 14 via a SPAL established using apparatus 12 with enhanced security because the point-to-point physical link so established is a dedicated link.

Apparatus 12 provides further advantages for transmission of traffic between hosts in network 10 when plurality of communication links 22 that connect each of hosts 14 with switch 20 are each optical links.

Apparatus 12 provides even further advantages for transmission of traffic between hosts in network 10 when switch 20 is an optical switch, so that apparatus 12 is an all-optical system. Said further advantages include improved quality of communication of traffic and advantages accruing from use of optical data management methods, as will be recognized by those skilled in the art.

The invention claimed is:

1. A method of providing switched physical alternate links (SPAL) that behave as point-to-point physical links between nodes in a packet network, comprising:

providing an apparatus that is overlaid on the packet network, comprising:
at least one switch;
physical communication links connecting selected nodes in the packet network with the at least one switch, the nodes being selected from among hosts and routers of the packet network, the physical communication links being selected from among optical fiber links, optical wavelength links, electrical links, optical free-space links, and a combination selected from among optical fiber links, optical wavelength links, electrical links, and optical free-space links;
identifying the need for SPAL for traffic in the packet network, based on at least one of selected characteristics of said traffic, an external command, and other selected criteria including: time, permission, application, and target address;

allocating a SPAL for said traffic;
causing said traffic to flow over the SPAL by activating the at least one switch and sending the traffic along the physical communication links to pass other switches of the packet network;
determining when the SPAL is no longer required, based on at least one of selected characteristics of said traffic, an external command, and other selected criteria including: time, permission, application, and target address;
removing said traffic from the SPAL; and
deallocating the SPAL.

2. The method according to claim 1, in which the nodes linked by the SPAL are hosts.

3. The method according to claim 1, in which one of the nodes is a host and another of the nodes is a router that are linked by the SPAL.

4. The method according to claim 1, in which the apparatus further comprises executable software instructions stored in a memory for managing said traffic between the nodes via the apparatus, the software instructions providing a SPAL Client software program that monitors traffic and controls routing at a node.

5. The method according to claim 1, in which the at least one switch is an optical circuit switch.

6. The method according to claim 1, in which a computer processor configured to execute a management software program stored in a memory is used to:

determine that a SPAL is required for traffic between one node and another node;
determine that a SPAL exists between the one node and the another node between which the SPAL is required;
establish a physical communication link between the one node and the another node via the at least one switch;
allocate that physical communication link to transmit the traffic between the one node and the another node for the duration required for transmission of the traffic; and
deallocate the physical communication link following transmission of the traffic.

7. The method according to claim 6, in which the computer processor acts on request to allocate the physical communication links between hosts.

8. A method of providing switched physical alternate links (SPAL) that behave as point-to-point physical links between nodes in a packet network, comprising:

providing an apparatus that is overlaid on the packet network, comprising:
at least one switch;
physical communication links connecting selected nodes in the packet network with the at least one switch, the nodes being selected from among hosts and routers of the packet network, the physical communication links being selected from among optical fiber links, optical wavelength links, electrical links, optical free-space links, and a combination selected from among optical fiber links, optical wavelength links, electrical links, and optical free-space links;
identifying the need for SPAL for traffic in the packet network, based on at least one of selected characteristics of said traffic, an external command, and other selected criteria including: time, permission, application, and target address;
allocating a SPAL for said traffic;
causing said traffic to flow over the SPAL by activating the at least one switch and sending the traffic along the physical communication links to pass other switches of the packet network;

determining when the SPAL is no longer required, based on at least one of selected characteristics of said traffic, an external command, and other selected criteria including: time, permission, application, and target address;

removing said traffic from the SPAL; and deallocating the SPAL upon completion of transmission of traffic for which the physical communication links between nodes have been allocated.

9. An apparatus that is overlaid onto a packet network to provide switched physical alternate links (SPAL) that behave as single point-to-point physical links between nodes in the packet network, to improve network capacity and reduce congestion, the apparatus comprising:

at least one switch;

physical communication links connecting selected nodes in the packet network with the at least one switch, the nodes being selected from among hosts and routers of the packet network, the physical communication links being selected from among optical fiber links, optical wavelength links, electrical links, optical free-space links, and a combination selected from among optical fiber links, optical wavelength links, electrical links, and optical free-space links; and at least one computer processor configured to execute at least one management software program stored in a memory, the at least one management software program managing traffic between nodes via the apparatus;

the SPAL being temporarily switched using the at least one switch, wherein the at least one switch is an optical cross-connect switch, an electrical switch, and a mechanical switch that is controlled at an end-point;

the computer processor acting on request to allocate the physical communication links between nodes by activating the at least one switch and sending the traffic along the physical communication links to bypass other switches of the packet network; and the at least one management software program stored in a memory being used to:

determine that a SPAL is required for the traffic between one node and another node;

determine that a SPAL exists between the one node and the another node between which the SPAL is required;

establish a SPAL as a physical communication link to transmit the traffic between the one node and the another node for the duration required for transmission of the traffic; and deallocate the physical communication links upon completion of transmission of the traffic for which the physical communication links between nodes have been allocated.

10. The method according to claim 9, in which the nodes linked by the SPAL are hosts.

11. The method according to claim 9, in which one of the nodes is a host and another of the nodes is a router that are linked by the SPAL.

12. The method according to claim 9, in which the management software program monitors traffic and controls routing at a node.

* * * * *